US010632697B2

(12) United States Patent
Tomoto et al.

(10) Patent No.: US 10,632,697 B2
(45) Date of Patent: Apr. 28, 2020

(54) TIRE SUPPORT DEVICE AND TIRE COOLING SYSTEM

(71) Applicant: MITSUBISHI HEAVY INDUSTRIES MACHINERY SYSTEMS, LTD., Hyogo (JP)

(72) Inventors: Keiichi Tomoto, Hiroshima (JP); Mitsuru Morita, Hiroshima (JP); Yoshikatsu Hineno, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 68 days.

(21) Appl. No.: 14/771,803

(22) PCT Filed: Feb. 6, 2014

(86) PCT No.: PCT/JP2014/052796
§ 371 (c)(1),
(2) Date: Sep. 1, 2015

(87) PCT Pub. No.: WO2015/118649
PCT Pub. Date: Aug. 13, 2015

(65) Prior Publication Data
US 2016/0009038 A1 Jan. 14, 2016

(51) Int. Cl.
*B29D 30/00* (2006.01)
*B29C 33/02* (2006.01)
(Continued)

(52) U.S. Cl.
CPC .......... *B29D 30/0061* (2013.01); *B29C 33/02* (2013.01); *B29C 35/16* (2013.01);
(Continued)

(58) Field of Classification Search
CPC ............... B60B 30/00; B29D 30/0061; B29D 30/0643; B29C 33/02; B29C 35/16; B29C 30/0643; B29C 2013/1658; B29L 2030/00
(Continued)

(56) References Cited

U.S. PATENT DOCUMENTS 4,092,090 A 5/1978 Yuhas et al.
8,769,807 B2 * 7/2014 Lawson ................ G01M 1/326
29/429

(Continued)

FOREIGN PATENT DOCUMENTS

JP 7-323427 A 12/1995
JP 2713701 B 2/1998
(Continued)

OTHER PUBLICATIONS

Office Action in TW Application No. 103103934, dated Feb. 19, 2016, with English translation for Search Report Part.
(Continued)

*Primary Examiner* — David P Bryant
*Assistant Examiner* — Nirvana Deonauth
(74) *Attorney, Agent, or Firm* — Hauptman Ham, LLP

(57) ABSTRACT

A tire support device includes: a first rim support portion; a second rim support portion which is provided so as to oppose the first rim support portion; a frame which includes a guide which movably guides the second rim support portion in a direction approaching or separating from the first rim support portion; a transport portion which is movably attached along the guide; a drive portion which moves the transport portion along the guide; an engagement mechanism which can engage with the frame at a retreat position at which the second rim support portion is separated from the first rim support portion; and a supported portion which integrally supports the second rim support portion and the
(Continued)

transport portion in a movable manner along the guide in a state where engagement with the engagement mechanism is released.

5 Claims, 18 Drawing Sheets

(51) Int. Cl.
  *B29D 30/06* (2006.01)
  *B29C 35/16* (2006.01)
  *B29L 30/00* (2006.01)
(52) U.S. Cl.
  CPC ..... *B29D 30/0603* (2013.01); *B29D 30/0643* (2013.01); *B29C 2035/1658* (2013.01); *B29L 2030/00* (2013.01)
(58) Field of Classification Search
  USPC .............................. 157/14–21, 1; 269/55, 58
  See application file for complete search history.

(56) References Cited

U.S. PATENT DOCUMENTS

| | | | |
|---|---|---|---|
| 2004/0013755 A1 | 1/2004 | Ichimaru | |
| 2007/0074823 A1* | 4/2007 | Reece | B60C 25/145 157/1 |
| 2011/0088812 A1* | 4/2011 | Singh | B29D 30/0643 141/250 |
| 2011/0100558 A1* | 5/2011 | Corghi | B60C 25/056 157/1.1 |
| 2011/0189324 A1 | 8/2011 | Fujieda et al. | |
| 2012/0133081 A1* | 5/2012 | Ichinose | B29D 30/0603 264/326 |
| 2015/0047790 A1* | 2/2015 | Matsunaga | B60C 25/00 157/15 |
| 2015/0343729 A1* | 12/2015 | Okada | B29D 30/0643 425/58.1 |

FOREIGN PATENT DOCUMENTS

| | | |
|---|---|---|
| JP | 2001-79849 A | 3/2001 |
| JP | 2002-67036 A | 3/2002 |
| JP | 2011-156772 A | 8/2011 |
| TW | 201144102 A1 | 12/2011 |

OTHER PUBLICATIONS

International Search Report dated May 13, 2014, corresponding to International Patent Application No. PCT/JP2014/052796.
Written Opinion dated May 13, 2014, corresponding to International Patent Application No. PCT/JP2014/052796.
Extended European Search Report in EP Application No. 14881773.7, dated Mar. 13, 2017.

* cited by examiner

TIRE SUPPORT DEVICE AND TIRE COOLING SYSTEM

RELATED APPLICATIONS

The present application is a National Phase of International Application Number PCT/JP2014/052796, filed Feb. 6, 2014.

TECHNICAL FIELD

The present invention relates to a tire support device and a tire cooling system.

BACKGROUND ART

A green tire (unvulcanized tire) is maintained at a predetermined pressure and a predetermined temperature in a mold of a vulcanizer and is subjected to vulcanization, and thus, a commercial tire (vulcanized tire) is manufactured. The vulcanized tire immediately after the vulcanization is performed is softened at high temperature, and is easily modified due to its own weight. In addition, the vulcanized tire shrinks when cooling. Accordingly, a post cure inflator (PCI) device is used, which performs inflation processing which cools the vulcanized tire while maintaining the shape of the vulcanized tire.

As shown in PTL 1, a PCI device includes tire holding means, rim lifting means, tire cooling means, and tire carrying-out means.

The tire holding means holds vulcanized and uncooled tire (hereinafter, referred to as an uncooled tire) which is carried-in from the vulcanizer side by a loader. The tire holding means includes a first rim which is fitted into one bead of the carried-in uncooled tire, and a second rim which is fitted into the other bead.

The rim lifting means inserts the second rim into the uncooled tire into which the first rim is fitted, and removes the second rim from the bead of a tire which is cooled (hereinafter, referred to as a cooled tire). Accordingly, the rim lifting means can move the second rim in a direction approaching or separating from the first rim. The rim lifting means includes a guide member which movably supports the second rim in the direction approaching or separating from the first rim, and a driving member such as a hydraulic pressure cylinder which moves the second rim along the guide member.

The tire cooling means injects a fluid such as compressed air into the uncooled tire into which the first rim and the second rim are fitted. In addition, the fluid is injected, a predetermined time elapses, and the uncooled tire is cooled.

The tire carrying-out means carries-out the cooled tire. Here, the second rim is removed from the bead of the cooled tire, and the rim lifting means is separated from the cooled tire held by the first rim. The tire carrying-out means holds the cooled tire held by the first rim, and carries-out the cooled tire to a carrying-out conveyor disposed in the vicinity of the PCI device, or the like. Accordingly, the tire carrying-out means includes a holding member which holds the tire, a guide member which movably supports the holding member in the direction approaching or separating from the first rim, and a driving member such as a hydraulic pressure cylinder which moves the holding member along the guide member.

In this way, the PCI device includes the guide member and the driving member as the rim lifting means and the tire carrying-out means.

CITATION LIST

Patent Literature

[PTL 1] Japanese Patent No. 2713701

SUMMARY OF INVENTION

Technical Problem

However, in the configuration which includes the guide member and the driving member as the rim lifting means and the tire carrying-out means, the number of parts increase, and man-hours required for assembly and maintenance increase.

An object of the present invention is to provide a tire support device and a tire cooling system capable of decreasing the number of parts and decreasing man-hours required for assembly and maintenance.

Solution to Problem

According to a first aspect of the present invention, there is provided a tire support device including: a first rim support portion which supports a first rim mounted on a tire; a second rim support portion which is provided so as to oppose the first rim support portion and supports a second rim mounted on the tire; a frame which includes a guide which movably guides the second rim support portion in a direction approaching the first rim support portion and in a direction separating from the first rim support portion; a transport portion which is movably attached along the guide, and performs at least one of extraction of the tire supported by the first rim support portion and attachment of the tire to the first rim support portion; a drive portion which moves the transport portion along the guide; an engagement mechanism which can engage with the frame at a retreat position at which the second rim support portion is separated from the first rim support portion; and a supported portion which integrally supports the second rim support portion and the transport portion in a movable manner along the guide in a state where engagement with the engagement mechanism is released.

According to a second aspect of the present invention, the engagement mechanism in the tire support device of the first aspect may include an engagement member which is provided on one of the second rim support portion and the frame, and can advance and retreat in a direction in which the second rim support portion and the frame are connected to each other; an engagement portion which is provided on the other of the second rim support portion and the frame and engages with the advanced engagement member; and an advancing-retreating portion which advances and retreats the engagement member.

According to a third aspect of the present invention, in the tire support device of the second aspect, a key portion which protrudes downward may be formed, and a key engagement portion, which meshes with the key portion in a state where the engagement member engages with the engagement portion, may be formed on the engagement portion.

According to a fourth aspect of the present invention, in the tire support device of any one of the first to third aspects, the device may further include a connection mechanism which integrally connects the second rim support portion and the transport portion.

According to a fifth aspect of the present invention, the engagement mechanism in the tire support device of the fourth aspect may include a movement member which is provided on one of the second rim support portion and the transport portion, and is moved by an engagement operation and a disengagement operation of the engagement mechanism; and a fixing member which is provided on the other of the second rim support portion and the transport portion, and in which a state where the fixing member and the movement member engage with each other and a state where the fixing member and the movement member disengage from each other may be switched by the movement of the movement member.

According to a sixth aspect of the present invention, a tire cooling system may include a tire support device of any one of first to fifth aspects, and a fluid supply portion which can supply a fluid injected into the tire in which the first rim and the second rim are mounted.

Advantageous Effects of Invention

According to the above-described tire support device and tire cooling system, it is possible to decrease the number of parts, and it is possible to decrease man-hours required for assembly and maintenance.

DESCRIPTION OF EMBODIMENTS

Figure 1:
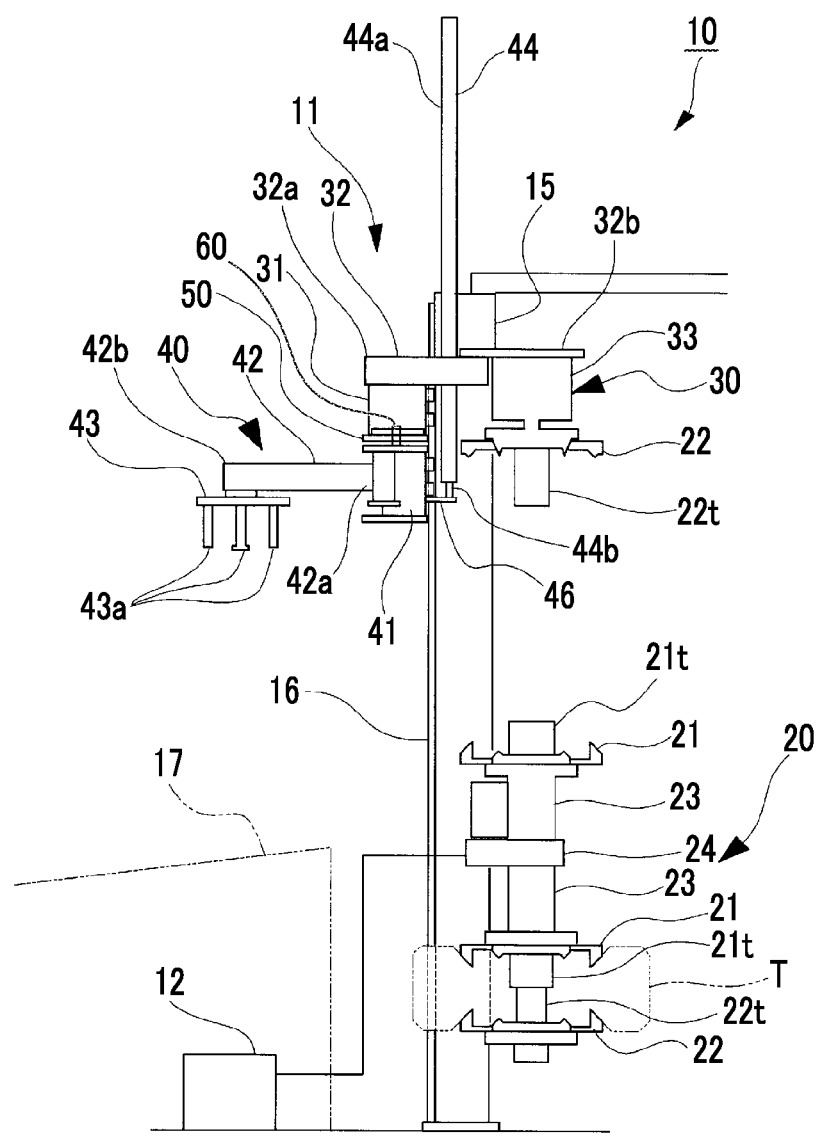
FIG. 1 is a side view showing a configuration of a PCI device in an embodiment of the present invention.
Figure 2:
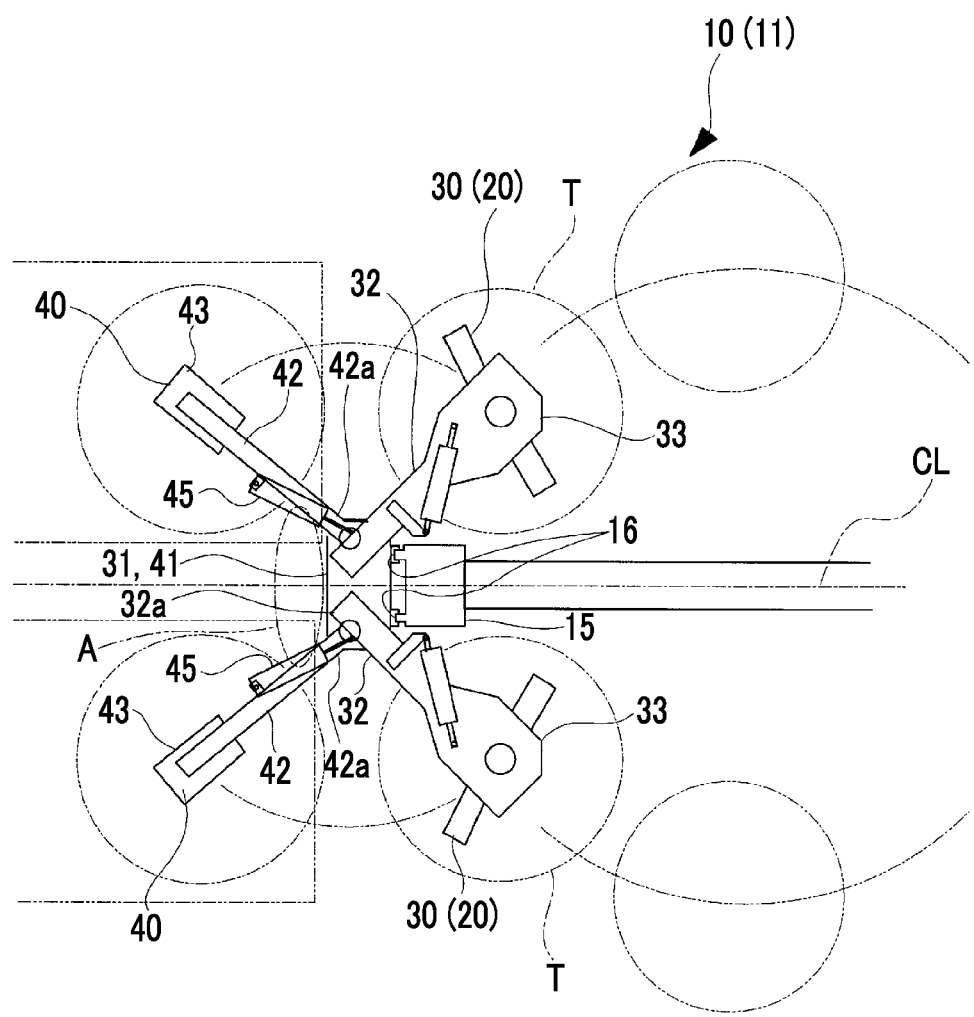
FIG. 2 is a plan view of the PCI device in the embodiment of the present invention.

FIG. 1 is a side view showing a configuration of a PCI device in an embodiment of the present invention. FIG. 2 is a plan view of the PCI device in the embodiment of the present invention.

As shown in FIG. 1, a PCI device (tire cooling system) 10 includes a tire support device 11 and a cooling fluid supply portion (fluid supply portion) 12.

The tire support device 11 supports a vulcanized tire T.

The cooling fluid supply portion 12 supplies (injects) a fluid such as air into the vulcanized tire T which is supported by the tire support device 11, and cools the tire T.

The tire support device 11 includes a post (frame) 15 which is erected on a floor surface, a tire holding portion 20, a rim lifting portion (second rim support portion) 30, and an unloader (transport portion) 40.

Here, as shown in FIG. 2, in the tire support device 11, two sets of the tire holding portions 20, the rim lifting portions 30, and the unloaders 40 are provided linearly symmetrically while a center axis CL connecting a vulcanizer in a previous process and the center of the post 15 is interposed between two sets.

Hereinafter, one set of the tire holding portion 20, the rim lifting portion 30, and the unloader 40 is described. However, the other set of the tire holding portion 20, the rim lifting portion 30, and the unloader 40 is similarly configured.

As shown in FIG. 1, the tire holding portion 20 holds the tire T which is carried-in from the vulcanizer (not shown) side by a loader.

The tire holding portion 20 includes a first rim 21 which is mounted on one bead of the carried-in tire T, and a second rim 22 which is mounted on the other bead.

The first rim 21 includes a tubular portion 21t, which protrudes to a space inside the bead of the tire T, in the center portion of the first rim 21. The first rim 21 is attached to a first rim support portion 23 which is fixed to the post 15.

In this embodiment, the tire holding portion 20 includes two sets of the first rims 21 and the first rim support portions 23. Accordingly, the tire holding portion 20 includes a support shaft 24 which is fixed to the lower portion of the post 15 which is erected on the floor surface. The support shaft 24 protrudes in a horizontal direction from the post 15. In a state where the support shaft 24 is interposed between two first rims 21 and 21, each of the two first rims 21 and 21 is provided on the support shaft 24 via the first rim support portion 23 extending in a vertical direction. The support shaft 24 is rotated around a horizontal axis, and accordingly, the first rim 21 provided via the first rim support portion 23 above and below the support shaft 24 can rotate around the horizontal axis.

The second rim 22 protrudes in a direction opposing the first rim 21, and includes a tubular portion 22t which is inserted into the tubular portion 21t. In a state where the tubular portion 22t is inserted into the tubular portion 21t, the tubular portion 21t and the tubular portion 22t detachably engage with each other. Accordingly, the second rim 22 can engage with and disengage from the first rim 21.

The rim lifting portion 30 includes a guide block 31, a support arm 32, and a rim support bracket 33.

The guide block 31 is movably guided by a guide rail (guide) 16, which is provided so as to be continuous on the side surface of the post 15 in the vertical direction, in a direction approaching and separating from the first rim 21.

A base end portion 32a of the support arm 32 is fixed to the upper surface of the guide block 31. The support arm 32 is provided so as to be gradually separated from the center axis CL with respect to the post 15 from the side on which the guide block 31 is provided toward the opposite side.

The rim support bracket 33 is provided below a tip portion 32b of the support arm 32. The rim support bracket 33 can be attached to or detached from the upper surface of the second rim 22. The rim support bracket 33 has a function which causes the tubular portion 22t of the second rim 22 to engage with or disengage from the tubular portion 21t of the first rim 21.

In a state where the rim lifting portion 30 supports the second rim 22 through the rim support bracket 33, the guide block 31 is vertically lifted or lowered along the guide rail 16. Accordingly, the rim lifting portion 30 can move the second rim 22 in the direction approaching or separating from the first rim 21. In addition, the rim lifting portion 30 can cause the second rim 22 to engage with or disengage from the first rim 21.

The unloader 40 includes a guide block 41, a support arm 42, and a tire holding portion 43.

The guide block 41 is slidably provided along the guide rail 16 which is provided so as to be continuous on the side surface of the post 15 in the vertical direction.

The guide block 41 is driven so as to be lifted and lowered along the guide rail 16 by a drive cylinder (drive portion) 44.

A cylinder main body 44a of the drive cylinder 44 is fixed to the post 15. The drive cylinder includes an extensible rod 44b which extends or contracts in the vertical direction from the cylinder main body 44a. The tip of the extensible rod 44b is connected to the guide block 41 via the bracket 46.

A base end portion 42a of the support arm 42 is rotatably connected to the guide block 41. An air cylinder 45 is rotatably connected to each of the guide block 41 and the support arm 42 between the guide block 41 and the support arm 42. The air cylinder 45 extends and contracts, and thus, the support arm 42 is swingable on a horizontal plane with the base end portion 42a connected the guide block 41 as the center.

The tire holding portion 43 includes a plurality of holding pieces 43a which hold the bead or the outer circumferential portion of the tire T. The tire holding portion 43 is provided on the lower surface of the tip portion 42b of the support arm 42.

As described above, in the tire support device 11, the guide block 31 of the rim lifting portion 30 and the guide block 41 of the unloader 40 are movably provided in the vertical direction along the guide rail 16 of the same post 15. Moreover, the guide block 31 of the rim lifting portion 30 is provided above the guide block 41 of the unloader 40.

Figure 3:
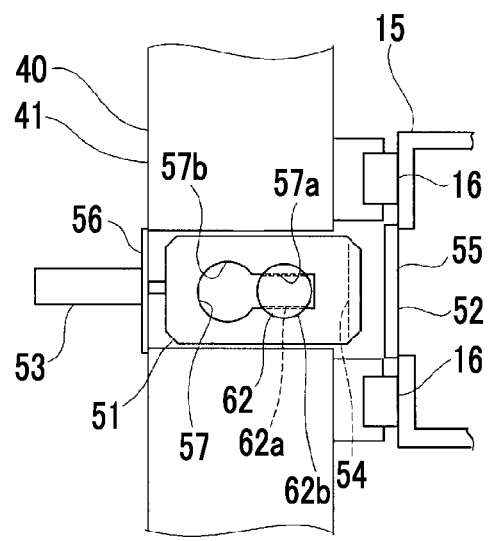
FIG. 3 is a plan view showing configurations of an engagement mechanism and a connection mechanism in the embodiment of the present invention.
Figure 4:
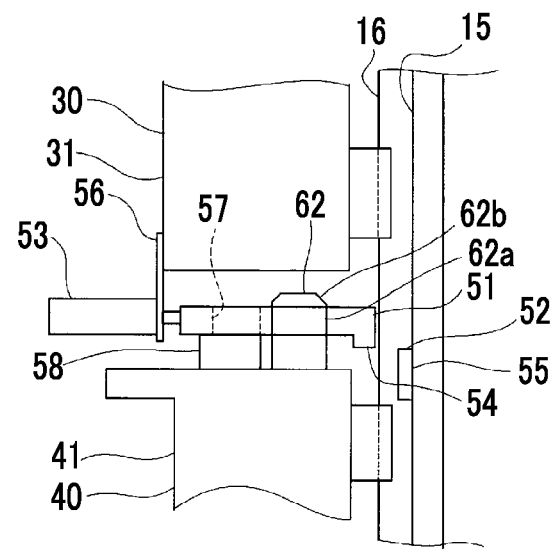
FIG. 4 is a side view showing the configurations of the engagement mechanism and the connection mechanism in the embodiment of the present invention.

FIG. 3 is a plan view showing configurations of an engagement mechanism and a connection mechanism in the embodiment of the present invention, and FIG. 4 is a side view showing the configurations of the engagement mechanism and the connection mechanism in the embodiment of the present invention.

As shown in FIGS. 3 and 4, the tire support device 11 further includes an engagement mechanism 50, a supported portion 58, and a connection mechanism 60.

The engagement mechanism 50 can engage with the post 15 at a retreat position at which the guide block 31 is separated from the first rim support portion 23. The engagement mechanism 50 includes an engagement member (movement member) 51, an engagement portion 52, and an advancing-retreating cylinder (advancing-retreating portion) 53.

The engagement member 51 is held so as to be advanced or retreated by a holding member (not shown) fixed to the guide block 31 of the rim lifting portion 30 in the direction in which the guide block 31 and the post 15 are connected to each other.

The advancing-retreating cylinder 53 is configured of an air cylinder or the like, and is supported by the guide block 31 via a support plate 56. The advancing-retreating cylinder 53 advances or retreats the engagement member 51 in the direction (for example, in a horizontal direction) in which the guide block 31 and the post 15 are connected to each other. The engagement member 51 is formed in a plate shape.

The engagement portion 52 is provided on the side surface of the post 15, and engages with the advanced engagement portion 51. The engagement portion 52 is formed at a predetermined position which is separated upward from the first rim support portion 23.

Figure 5:
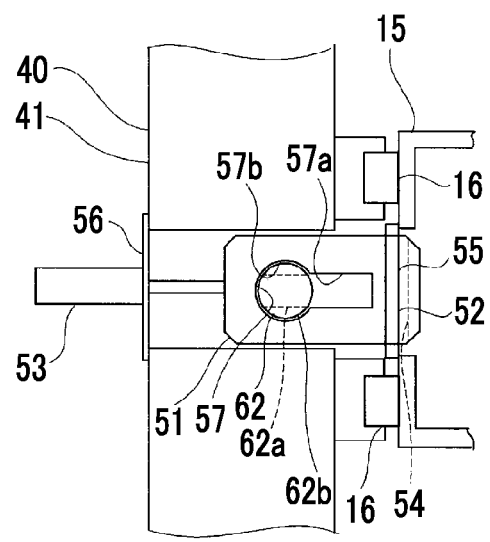
FIG. 5 is a plan view showing a state where the engagement mechanism engages with a post in the embodiment of the present invention.
Figure 6:
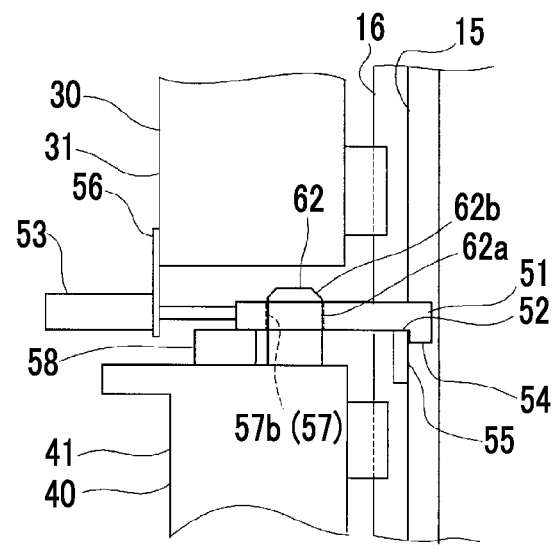
FIG. 6 is a side view showing the state where the engagement mechanism engages with the post in the embodiment of the present invention.
Figure 7:
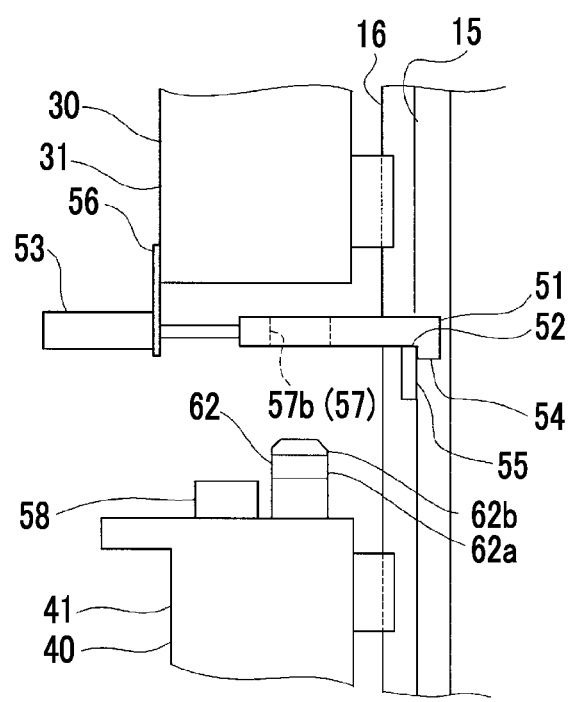
FIG. 7 is a side view showing a state where the engagement mechanism engages with the post and an unloader is lowered in the embodiment of the present invention.

FIG. 5 is a plan view showing a state where the engagement mechanism engages with the post in the embodiment of the present invention. FIG. 6 is a side view showing the state where the engagement mechanism engages with the post in the embodiment of the present invention. FIG. 7 is a side view showing a state where the engagement mechanism engages with the post and the unloader is lowered in the embodiment of the present invention.

As shown in FIGS. 5 and 6, in the engagement mechanism 50, if the engagement member 51 advances toward the engagement portion 52 provided in the post 15 via the advancing-retreating cylinder 53, the engagement member 51 engages with the engagement portion 52. Accordingly, the rim lifting portion 30 engages with the post 15 at the retreat position at which the rim lifting portion 30 is separated from the first rim support portion 23.

A key portion 54 protruding downward is formed on the tip portion of the engagement member 51. In addition, in the state where the engagement member 51 advances and engages with the engagement portion 52, a key engagement portion 55 meshing with the key portion 54 is formed at the position opposing the key portion 54 on the engagement portion 52.

If the key portion 54 meshes with the key engagement portion 55, it is possible to prevent the engagement member 51 from unintentionally disengaging from the engagement portion 52.

The supported portion 58 is provided to protrude from the upper surface of the guide block 41 of the unloader 40. The supported portion 58 supports the load of the rim lifting portion 30. In addition, in the state where the engagement between the rim lifting portion 30 and the post via the engagement mechanism 50 is released, the supported portion 58 supports the rim lifting portion 30 so that the rim lifting portion 30 and the unloader 40 integrally move along the guide rail 16.

In the state where the engagement between the rim lifting portion 30 and the post 15 via the engagement mechanism 50 is released, the connection mechanism 60 integrally connects the rim lifting portion 30 and the unloader 40. The connection mechanism 60 is configured to include the engagement member 51 of the engagement mechanism 50, and a fixing member 62 which is provided on the unloader 40.

A through-hole 57 is formed on the engagement member 51 which is a movement member in the connection mechanism 60. The through-hole 57 extends in the direction (for example, the horizontal direction) in which the guide block 31 and the post 15 are connected to each other. In the through-hole 57, the side closest to the post 15 is set to a first hole portion 57a, and the side farthest from the post 15 is set to a second hole portion 57b. The first hole portion 57a is formed in a straight line having a constant width. The second hole portion 57b is formed so as to be continuous with the first hole portion 57a, and is formed so as to have a larger width dimension than that of the first hole portion 57a.

The fixing member 62 is provided so as to protrude upward from the upper surface of the guide block 41 of the unloader 40. The fixing member 62 includes a first shaft portion 62a and a second shaft portion 62b. The first shaft portion 62a has a narrower width than that of the first hole portion 57a of the through-hole 57. The second shaft portion 62b is formed on the first shaft portion 62a, and has a width which is wider than that of the first hole portion 57a and is narrower than that of the second hole portion 57b.

As shown in FIGS. 3 and 4, in the connection mechanism 60, in a state where the engagement member 51 retreats from the post 15 side and the engagement member 51 does not engage with the engagement portion 52, the first shaft portion 62a of the fixing member 62 is positioned in the first hole portion 57a of the through-hole 57. Accordingly, the second shaft portion 62b which has a wider width than that of the first hole portion 57a is positioned above the first hole portion 57a, and thus, the engagement member 51 and the fixing member 62 are prevented from being separated from each other in the vertical direction. Therefore, in the state where the engagement between the rim lifting portion 30 and the post 15 by the engagement mechanism 50 is released, the rim lifting portion 30 and the unloader 40 are integrally connected to each other. In this state, if the unloader 40 is vertically moved by the drive cylinder 44, the rim lifting portion 30 also moves integrally with the unloader 40.

In addition, as shown in FIGS. 5 and 6, in the connection mechanism 60, in the state where the engagement member 51 advances toward the post 15 side and the engagement member 51 engages with the engagement portion 52, the second shaft portion 62b of the fixing member 62 is positioned above the second hole portion 57b of the through-hole 57. Accordingly, the second shaft portion 62b can be disengaged from the second hole portion 57b, and the fixing member 62 can be disengaged downward from the through-hole 57. Therefore, in the connection mechanism 60, in the state where the rim lifting portion 30 and the post 15 are engaged with each other via the engagement mechanism 50, the rim lifting portion 30 and the unloader 40 can be disconnected from each other. In this state, if the drive cylinder 44 is operated, as shown in FIG. 7, the state where the rim lifting portion 30 engages with the post 15 is maintained at the retreat position at which the rim lifting portion 30 is separated from the first rim support portion 23, and only the unloader 40 can move vertically.

In this way, in the connection mechanism 60, by the movement (engagement operation and disengagement operation) of the engagement member 51, the state where the fixing member 62 and the engagement member 51 engage with each other and the state where the fixing member 62 and the engagement member 51 disengage from each other can be switched.

Figure 8:
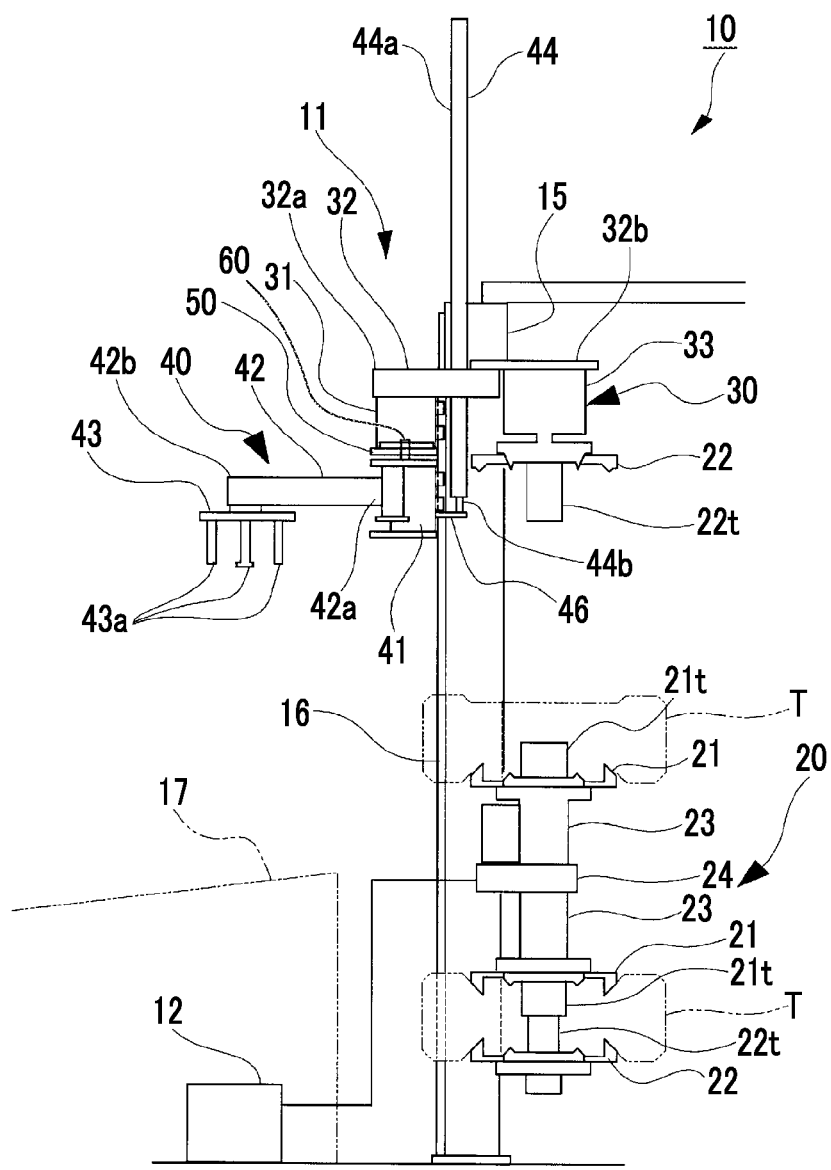
FIG. 8 is a side view showing a state where an uncooled tire is set onto a first rim in the PCI device according to the embodiment of the present invention.
Figure 9:
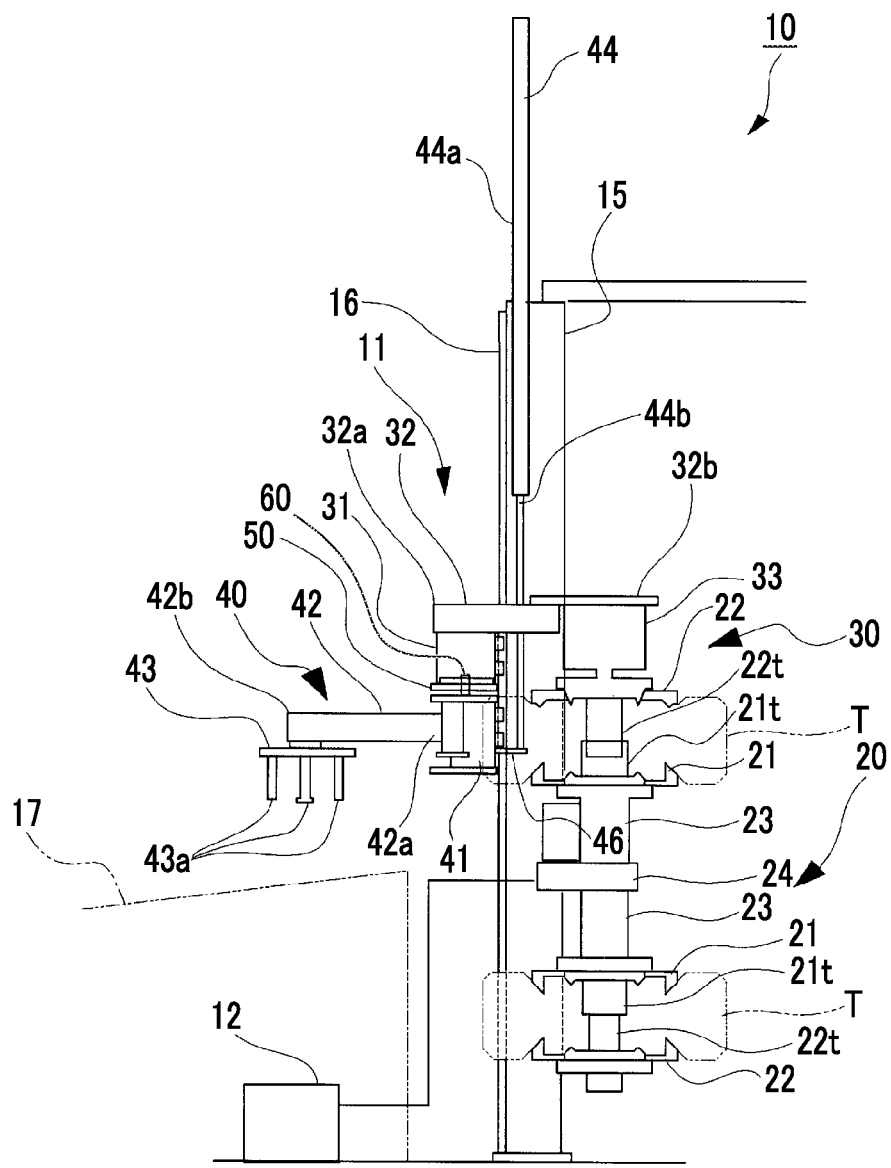
FIG. 9 is a side view showing a state where a rim lifting portion and the unloader are integrally lowered and a second rim is mounted on the tire in the PCI device according to the embodiment of the present invention.

Next, a method of cooling the tire T in the above-described PCI device 10 will be described. FIG. 8 is a side view showing a state where an uncooled tire is set onto a first rim in the PCI device according to the embodiment of the present invention. FIG. 9 is a side view showing a state where the rim lifting portion and the unloader are integrally lowered and the second rim is mounted on the tire in the PCI device according to the embodiment of the present invention.

Figure 10:
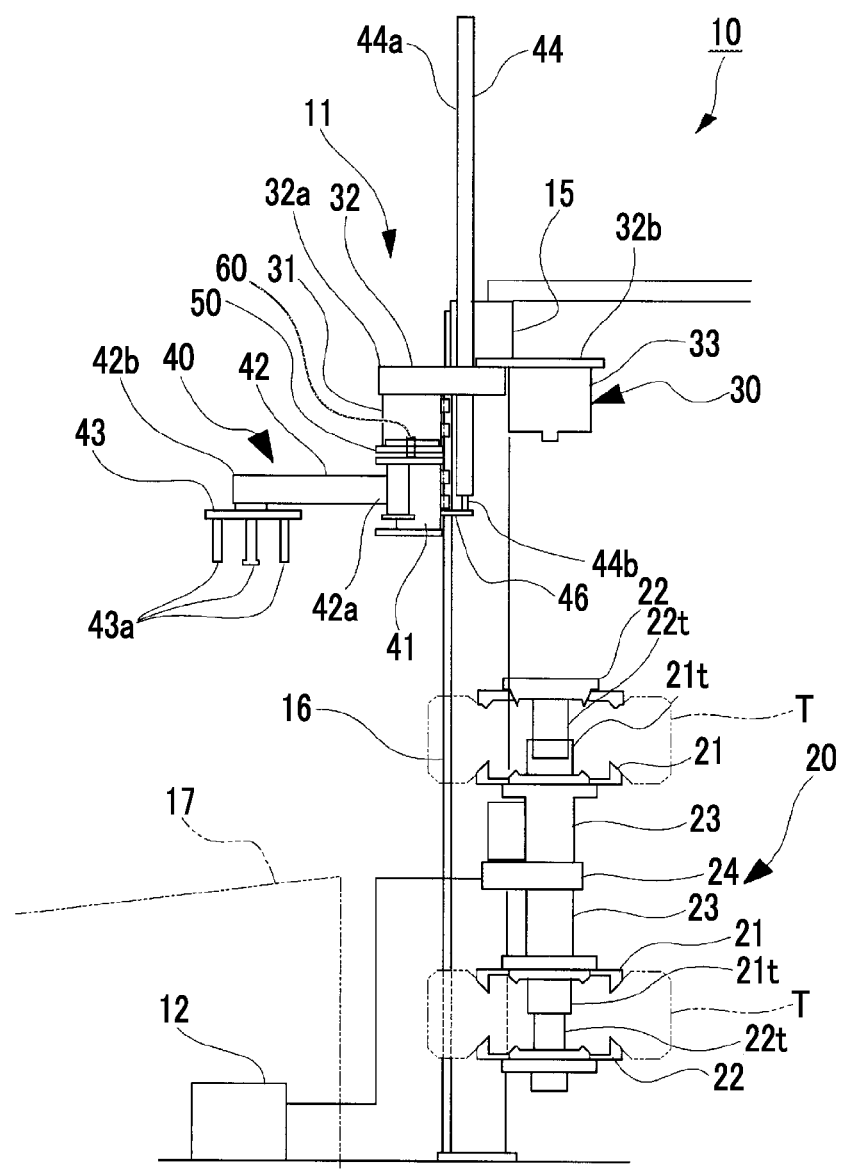
FIG. 10 is a side view showing a state where the second rim is mounted on the tire in the PCI device according to the embodiment of the present invention.
Figure 11:
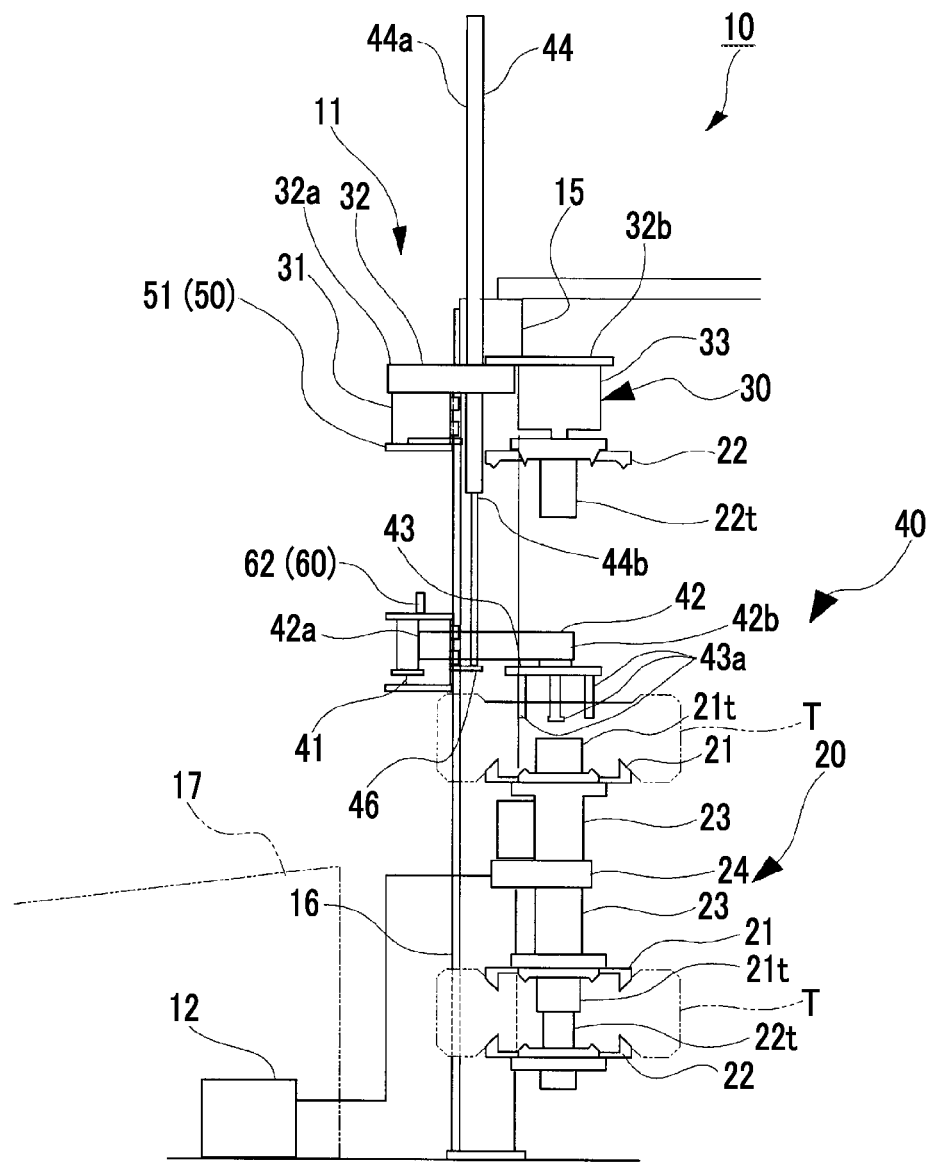
FIG. 11 is a side view showing a state where the rim lifting portion engages with the post and the unloader is lowered in the PCI device according to the embodiment of the present invention.
Figure 12:
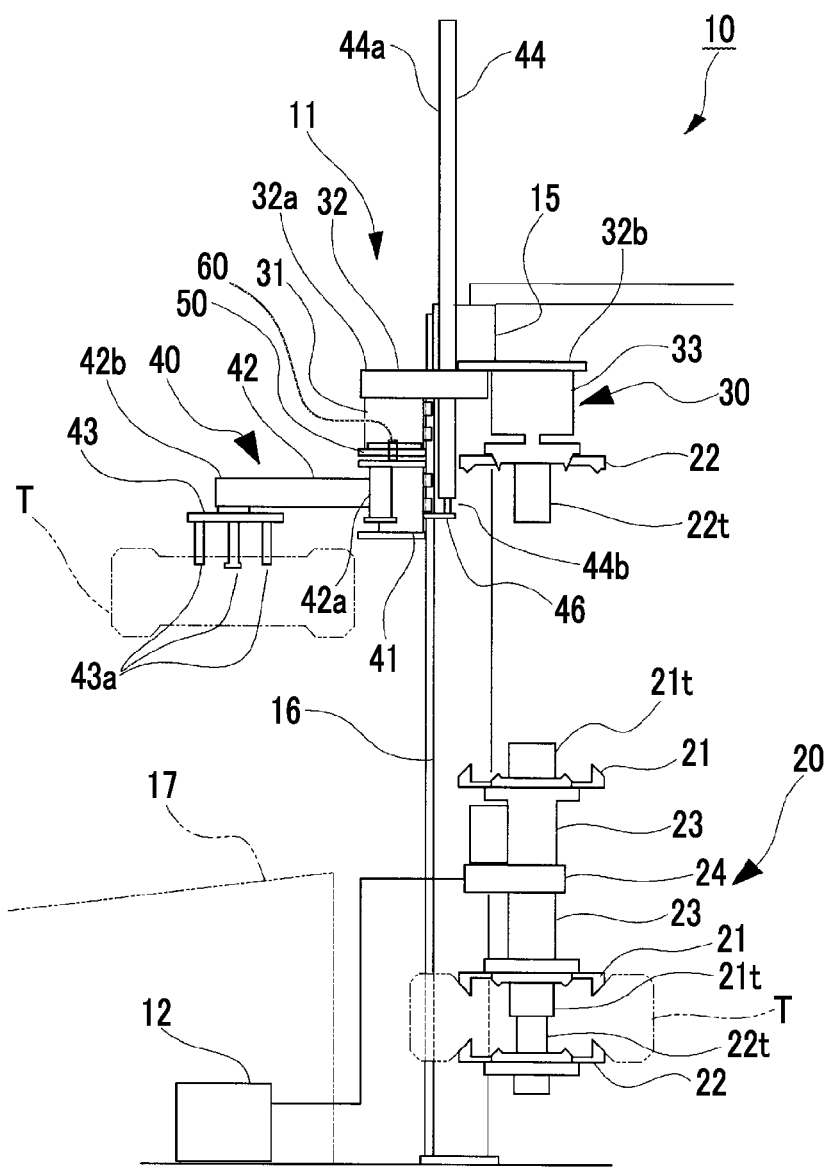
FIG. 12 is a side view showing a state where the tire is carried-out by the unloader in the PCI device according to the embodiment of the present invention.

FIG. 10 is a side view showing a state where the second rim is mounted on the tire in the PCI device according to the embodiment of the present invention. FIG. 11 is a side view showing a state where the rim lifting portion engages with the post and the unloader is lowered in the PCI device according to the embodiment of the present invention. FIG. 12 is a side view showing a state where the tire is carried-out by the unloader in the PCI device according to the embodiment of the present invention.

Here, as shown in FIG. 1, in the PCI device 10, the tire T is held by the first rim 21 and the second rim 22 positioned at the lower side of the tire holding portion 20 while the tire T is cooled.

First, as shown in FIG. 8, the vulcanized and uncooled tire T is set onto the first rim 21, which is positioned at the upper side in the tire holding portion 20, by the loader provided on the vulcanizer (not shown) in the previous process.

Subsequently, the second rim 22 which is supported by the rim support bracket 33 of the rim lifting portion 30 is mounted on the bead of the uncooled tire T. Here, first, as shown in FIG. 9, the drive cylinder 44 extends downward, and the rim lifting portion 30 is lowered along with the unloader 40. In addition, the second rim 22 supported by the rim support bracket 33 is inserted into the bead of the uncooled tire T. Moreover, the rim support bracket 33 causes the tubular portion 22*t* of the second rim 22 to engage with the tubular portion 21*t* of the first rim 21.

In this state, as shown in FIG. 10, the first rim 21 and the second rim 22 are mounted on the beads of the both surfaces of the uncooled tire T. In addition, the cooling fluid supply portion 12 supplies the cooling fluid such as air into the tire T, and thus, the tire T is cooled.

After the second 22 is mounted on the tire T, the drive cylinder 44 is shrunk upward. Accordingly, the rim lifting portion 30 is lifted by the unloader 40. In addition, if the rim lifting portion 30 is lifted to a predetermined height at which the engagement member 51 provided in the rim lifting portion 30 opposes the engagement portion 52 of the post 15 side, the drive cylinder 44 stops. Accordingly, the rim lifting portion 30 is retreated to the position at which the rim lifting portion 30 is separated upward from the first rim 21.

Subsequently, the tire T, which is held by the first rim 21 and the second rim 22 positioned at the lower side in the tire holding portion 20 and is cooled, is extracted. Here, the support shaft 24 rotates, and the first upper rim 21 and upper rim support portion 23, and the first lower rim 21 and lower rim support portion 23 are inverted. Accordingly, the tire T, which is held by the first rim 21 and the second rim 22 positioned at the lower side and is cooled, moves to the upper side of the support shaft 24. In addition, in this way, the uncooled tire T which is newly set moves to the lower side of the support shaft 24.

In addition, as shown in FIGS. 5 and 6, the engagement member 51 is advanced toward the post 15 by the advancing-retreating cylinder 53 and engages with the engagement portion 52. Accordingly, the rim lifting portion 30 engages with the post 15 at the retreat position at which the rim lifting portion 30 is separated from the first rim support portion 23.

In this way, if the engagement member 51 engages with the engagement portion 52, the second hole portion 57*b* of the through-hole 57 formed on the engagement member moves to the position of the fixing member 62. Accordingly, in the connection mechanism 60, the rim lifting portion 30 and the unloader 40 are disconnected from each other.

Subsequently, as shown in FIG. 11, the unloader 40 is lowered. Here, the drive cylinder 44 extends downward. Accordingly, the state where the rim lifting portion 30 engages with the post 15 is maintained at the retreat position at which the rim lifting portion 30 is separated from the first rim support portion 23, and only the unloader 40 is lowered.

As shown in FIG. 7, in the rim lifting portion 30 in which the state where the rim lifting portion 30 engages with the post 15 is maintained, the key portion 54 of the engagement member 51 which engages with the engagement portion 52 is pressed downward by the own weight of the rim lifting portion 30, and the key portion 54 meshes with the key engagement portion 55.

In addition, in the unloader 40, the air cylinder 45 is operated at a height at which the rim lifting portion and the tire T do not interfere with each other. Accordingly, the support arm 42 is turned, and tip portion 42*b* moves to the vertically upper side of the cooled tire T.

In addition, the drive cylinder 44 extends downward, and the tire holding portion 43 is lowered. If the holding piece 43*a* is lowered to the same level as the cooled tire T, the extension of the drive cylinder 44 stops, and the holding piece 43*a* holds the cooled tire T.

Subsequently, the drive cylinder 44 is shrunk, and the unloader 40 which holds the cooled tire T is lifted. In addition, as shown in FIG. 12, the air cylinder 45 is operated, the support arm 42 is turned, and the tip portion 42*b* is moved to the vertically upper side of the transport conveyor 17.

Subsequently, the drive cylinder 44 extends, and the cooled tire T held by the tire holding portion 43 is lowered and is disposed on the transport conveyor 17. The cooled tire T is carried-out from the PCI device 10 by the transport conveyor 17.

Accordingly, the state returns to the state shown in FIG. 1. In this state, the uncooled tire T is held by the first rim 21 and the second rim 22 positioned at the lower side in the tire holding portion 20, the cooling fluid is supplied to the tire T, and thus, the tire T is cooled. Moreover, similar to the above, the next uncooled tire T is carried into the PCI device 10, and after the tire T is held by the first rim 21 and the second rim 22 at the upper side of the tire holding portion 20, the upper portion and the lower portion of the tire holding portion 20 are inverted, and thus, the tire T is carried-out from the tire holding portion 20 by the unloader 40.

According to the tire support device 11 and the PCI device 10 in the above-described embodiment, the rim lifting portion 30 and the unloader 40 are movably provided along the guide rail 16 of the post 15. In addition, the tire support device 11 and the PCI device 10 include the engagement mechanism 50 which can engage with the post 15 at the retreat position at which the rim lifting portion 30 is separated from the first rim support portion 23, and the supported portion 58 which movably supports the rim lifting portion 30 integrally with the unloader 40 along the guide rail 16 in the state where the engagement with the engagement mechanism 50 is released.

According to this configuration, if the rim lifting portion 30 is engaged with the post 15 at the retreat position, at which the rim lifting portion 30 is separated from the first rim support portion 23, by the engagement mechanism 50, it is possible to move only the unloader 40 along the guide rail 16 by the drive cylinder 44. In addition, if the drive cylinder 44 is operated in the state where the engagement with the engagement mechanism 50 is released, it is possible to move the rim lifting portion 30, which is supported by the supported portion 58 integrally with the unloader 40 along the guide rail 16.

In this way, while the rim lifting portion 30 and the unloader 40 are provided on the guide rail 16 of one set of posts 15, it is possible to perform the desired operation of each of the rim lifting portion 30 and the unloader 40. Accordingly, it is possible to decrease the number of parts of the tire support device 11 and the PCI device 10. As a result, it is possible to decrease man-hours required for assembly or maintenance.

In addition, it is possible to move the rim lifting portion 30 and the unloader 40 along the guide rail 16 on one surface side of the post 15. Accordingly, it is possible to effectively use a space A (refer to FIG. 2) of the other side of the post 15 as a space for installing the drive cylinder 44 or the air cylinder 45 configuring the PCI device 10, an electronic valve for operating the advancing-retreating cylinder 53, parts such as a speed controller, or pipes for an operating fluid.

In addition, in the engagement mechanism 50, the engagement member 51 is advanced or retreated by the advancing-retreating cylinder 53 provided on the rim lifting portion 30 side, and thus, the engagement member can engage with and disengage from the engagement portion 52 formed on the post 15 side. In the engagement mechanism 50, the engagement member 51 engages with the engagement portion 52, and thus, the rim lifting portion 30 can engage with the post 15. Accordingly, in the state where the rim lifting portion 30 remains on the post 15, it is possible to operate only the unloader 40 independently.

In addition, the key portion 54 is formed on the tip portion of the engagement member 51, and the key engagement portion 55 is formed on the engagement portion 52. Since the key portion 54 meshes with the key engagement portion 55, it is possible to prevent the engagement member 51 from unintentionally disengaging from the engagement portion 52.

Moreover, it is possible to integrally connect the rim lifting portion 30 and the unloader 40 by the connection mechanism 60. Accordingly, if the drive cylinder 44 is operated in the state where the engagement with the engagement mechanism 50 is released, it is possible to move the rim lifting portion 30 and the unloader 40, which are integrally connected by the connection mechanism 60, along the guide rail 16.

In addition, in the rim lifting portion 30, when the second rim 22 is inserted into the bead of the tire T, since the unloader 40 is connected to the rim lifting portion 30 by the connection mechanism 60, it is possible to use the weight of the unloader 40 and thrust of the drive cylinder 44 in addition to the weight of the rim lifting portion 30. Accordingly, it is possible to more securely insert the second rim 22 into the bead of the tire T.

(Modification Example of Embodiment)

In addition, the present invention is not limited to the above-described embodiment, and a design change can be performed within a scope which does not depart from the gist of the present invention.

(First Modification Example)

For example, in the embodiment, the rim lifting portion 30 and the unloader 40 are disposed on the upper side while the first rim 21 of the tire holding portion 20 is disposed on the lower side. However, the present invention is not limited to this.

Figure 13:
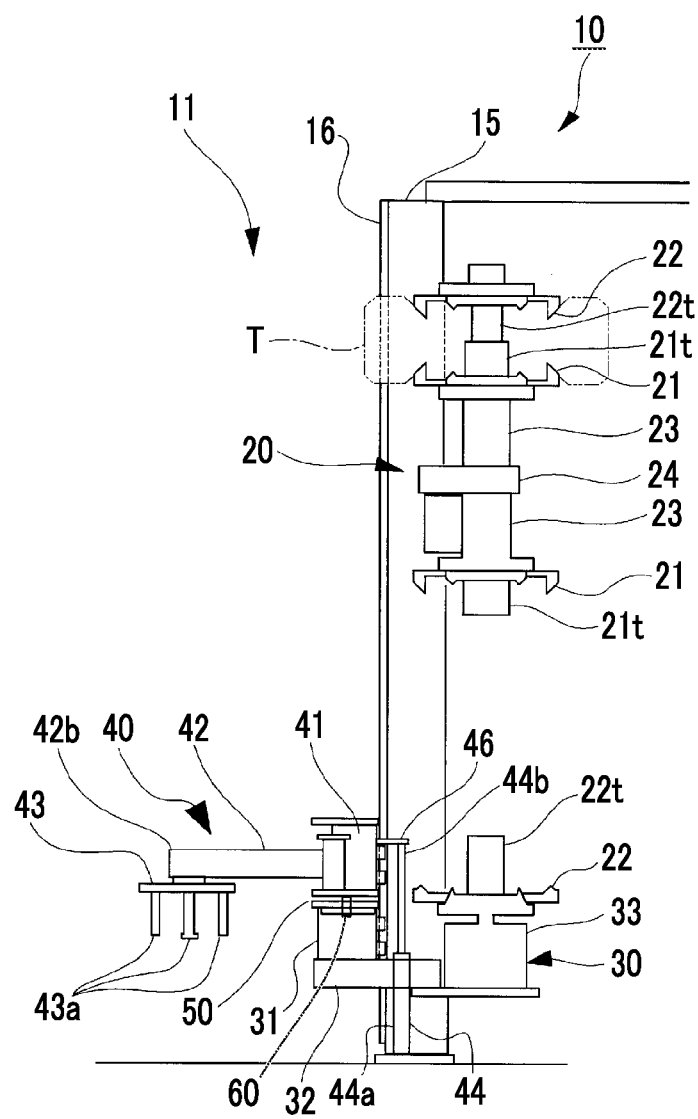
FIG. 13 is a side view showing a first modification example of the PCI device in the embodiment of the present invention.

FIG. 13 is a side view showing a first modification example of the PCI device in the embodiment of the present invention.

As shown in FIG. 13, the first rim 21 of the tire holding portion 20 may be disposed on the upper side, and the rim lifting portion 30 and the unloader 40 may be disposed on the lower side. In this case, the rim lifting portion 30 and the unloader 40 move in the vertical direction via the drive cylinder 44 which extends and contracts upward. In addition, similar to the above-described embodiment, the rim lifting portion 30 can engage with and disengage from the post 15 via the engagement mechanism 50. In addition, similar to the above-described embodiment, the rim lifting portion 30 and the unloader 40 can be connected to each other by the connection mechanism 60.

(Second Modification Example)

Moreover, in the above-described embodiment, the unloader 40 which carries-out the cooled tire T from the tire support device 11 and the PCI device 10 is provided. However, the present invention is not limited to this. Instead of the unloader 40, a loader which carries the uncooled tire T from the vulcanizer into the tire support device 11 and the PCI device 10 may be provided.

(Third Modification Example)

In addition, by enlarging a swinging range of the support arm 42, it is possible to realize a configuration having both the function of the loader which carries the uncooled tire T from the vulcanizer into the tire support device 11 and the PCI device 10, and the function of the unloader which carries-out the cooled tire T.

(Fourth Modification Example)

In addition, in the above-described embodiment, in the unloader 40, the support arm 42 is swung between the vertical upper position of the tire T into which the first rim 21 is fitted and the position at which the tire T is disposed on the transport conveyor 17. However, the present invention is not limited to this.

Figure 14:
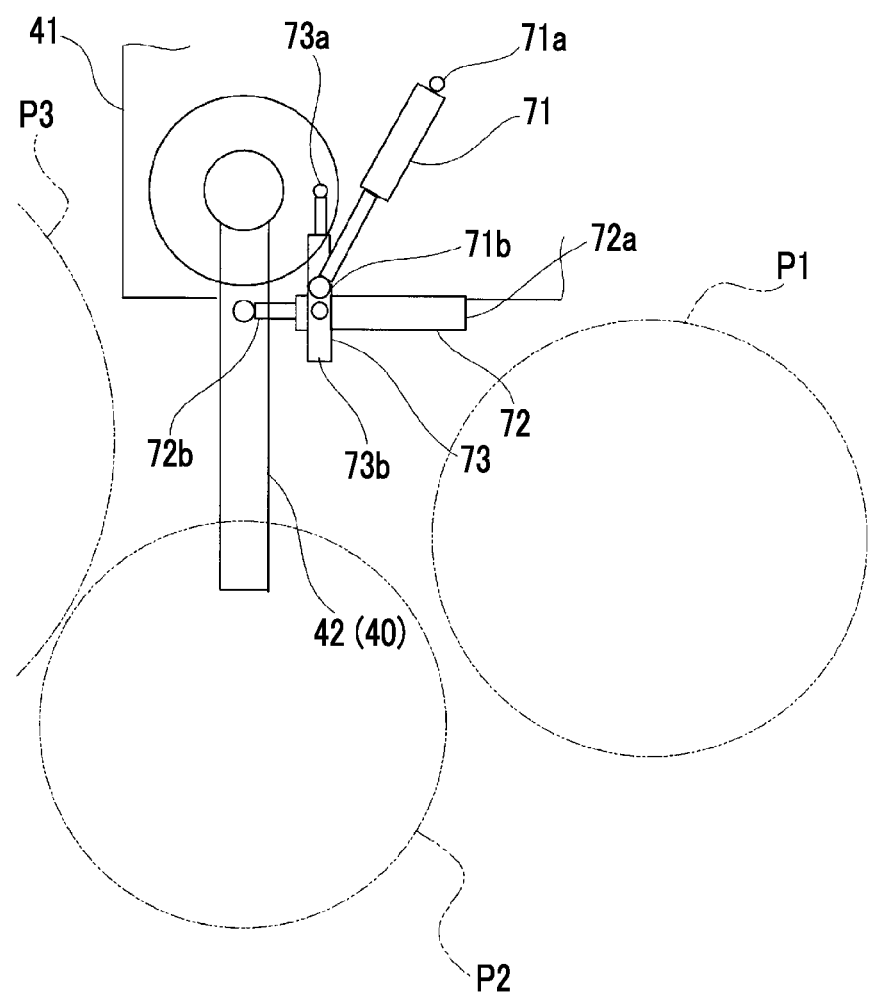
FIG. 14 is a view showing a fourth modification example of the PCI device in the embodiment of the present invention, and a plan view showing a configuration in which a support arm of the unloader is turned in three stages.
Figure 15:
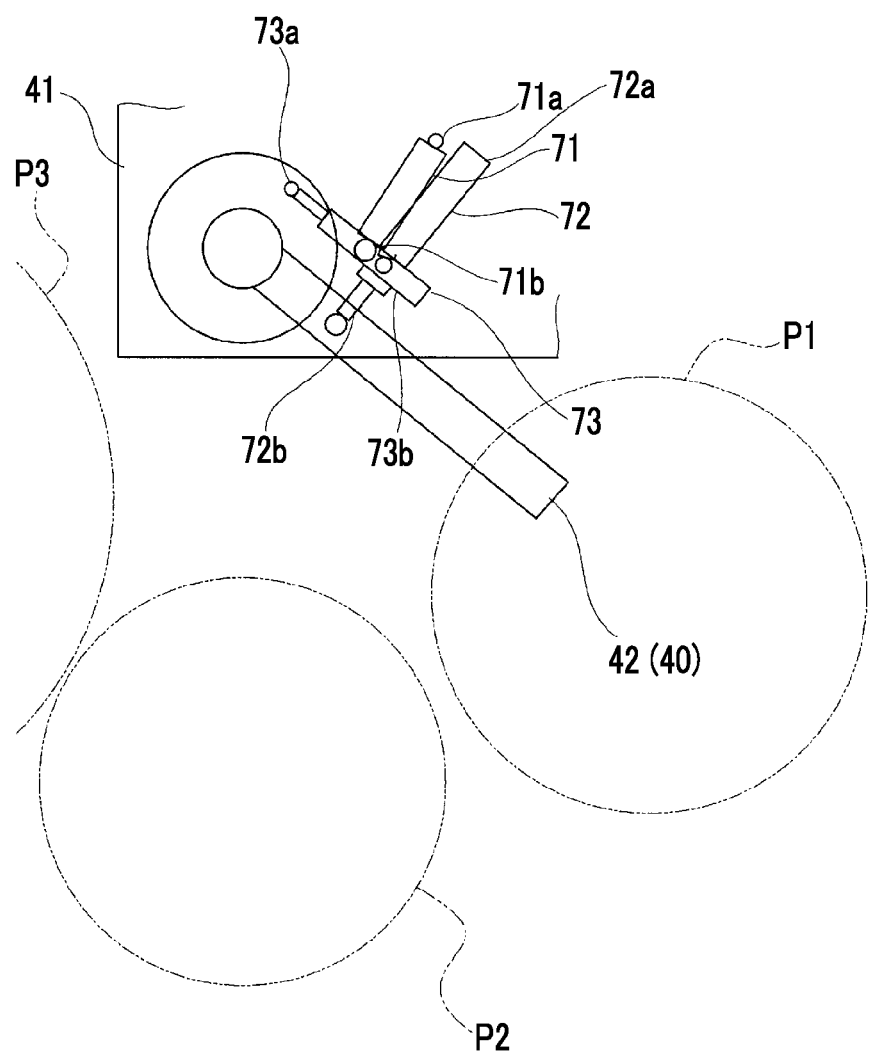
FIG. 15 is a view showing the fourth modification example of the PCI device in the embodiment of the present invention, and a plan view showing a state where the support arm of the unloader is turned at a position different from that shown in FIG. 14.
Figure 16:
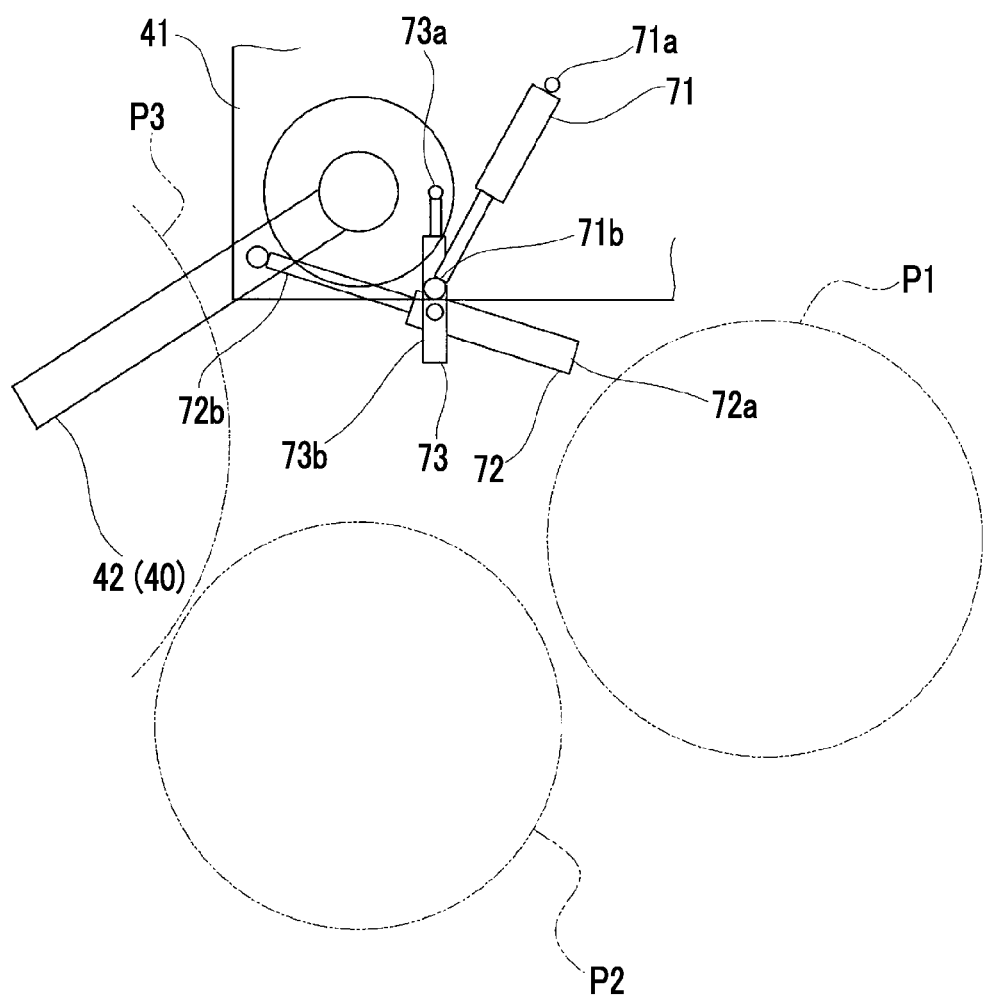
FIG. 16 is a view showing the fourth modification example of the PCI device in the embodiment of the present invention, and a plan view showing a state where the support arm of the unloader is turned at a position different from those shown in FIGS. 14 and 15.

FIG. 14 is a view showing a fourth modification example of the PCI device in the embodiment of the present invention, and a plan view showing a configuration in which the support arm of the unloader is turned in three stages. FIG. 15 is a view showing the fourth modification example of the PCI device in the embodiment of the present invention, and a plan view showing a state where the support arm of the unloader is turned at a position different from that shown in FIG. 14. FIG. 16 is a view showing the fourth modification example of the PCI device in the embodiment of the present invention, and a plan view showing a state where the support arm of the unloader is turned at positions different from those shown in FIGS. 14 and 15.

For example, as shown in FIGS. 14 to 16, the support arm 42 may be swung by two air cylinders 71 and 72. In this configuration, a first end portion 71*a* of the air cylinder 71 is rotatably connected to the guide block 41 in a horizontal plane. A second end portion 71*b* of the air cylinder 71 is rotatably connected to an intermediate portion of a link plate 73. The link plate 73 rotatably connects a third end portion 73*a* to the guide block 41. In addition, a main body 72*a* of the air cylinder 72 is rotatably connected to a fourth end portion 73*b* side of the link plate 73. In addition, an extensible rod 72*b* of the air cylinder 72 is rotatably connected to the intermediate portion of the support arm 42.

In this configuration, as shown in FIG. 15, if both air cylinders 71 and 72 are shrunk, the support arm 42 moves to a first position P1. In addition, as shown in FIG. 14, if only the air cylinder 71 extends and the state where the air cylinder 72 is shrunk is maintained, the support arm 42 moves to a second position P2 which is different from the first position P1 in the turning direction of the support arm 42. In addition, as shown in FIG. 16, if both air cylinders 71 and 72 extend, the support arm 42 moves to a third position P4 which is different from the first position P1 and the second position P2 in the turning direction of the support arm 42.

According to the configuration, it is possible to move the support arm 42 to three positions P1, P2, and P3 using the inexpensive air cylinders 71 and 72 which are operated by being switched ON/OFF.

In addition, one of the three positions P1, P2, and P3 is set to the position at which the unloader 40 does not interfere with the PCI device 10 and the transport conveyor 17 in the movement range of the unloader 40 generated by the drive cylinder 44, and thus, it is possible to eliminate a limitation on a disposition height of the transport conveyor 17.

(Fifth Modification Example)

In the above-described embodiment, specific configurations of the engagement mechanism 50 and the connection mechanism 60 are described. However, the present invention is not limited to this.

Figure 17:
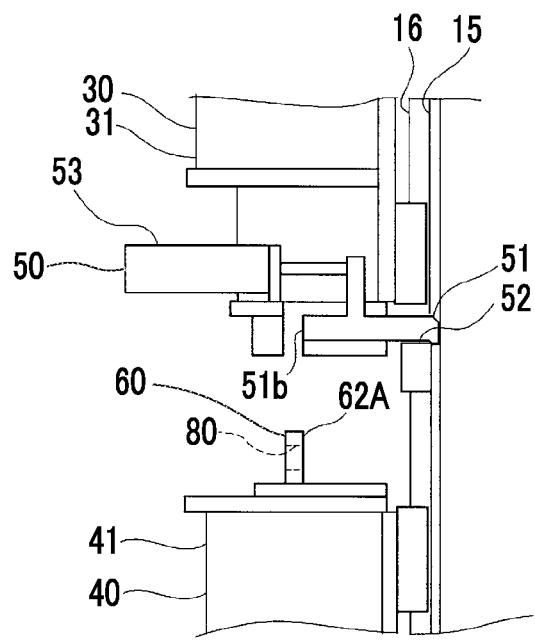
FIG. 17 is a side view showing modification examples of the engagement mechanism and the connection mechanism in the embodiment of the present invention.
Figure 18:
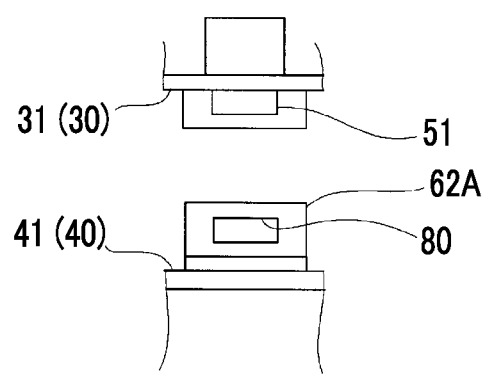
FIG. 18 is a view showing the modification examples of the engagement mechanism and the connection mechanism in the embodiment of the present invention, and a view when seen from the left side of FIG. 17.
Figure 19:
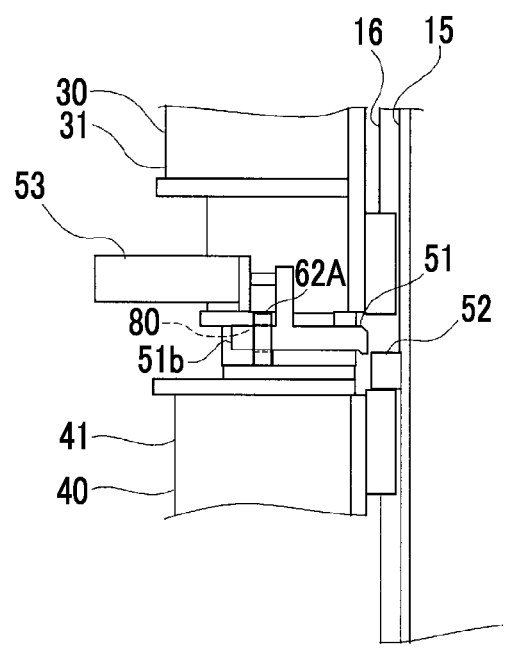
FIG. 19 is a view showing the modification examples of the engagement mechanism and the connection mechanism in the embodiment of the present invention, and a side view showing a state where the rim lifting portion and the unloader are connected to each other.

FIG. 17 is a side view showing modification examples of the engagement mechanism and the connection mechanism in the embodiment of the present invention. FIG. 18 is a view showing the modification examples of the engagement mechanism and the connection mechanism in the embodiment of the present invention, and a view from the left side of FIG. 17. FIG. 19 is a view showing the modification examples of the engagement mechanism and the connection mechanism in the embodiment of the present invention, and a side view showing a state where the rim lifting portion and the unloader are connected to each other.

As shown in FIGS. 17 to 19, a fixing member 62A of the connection mechanism 60 may include a hole 80 into which the rear end portion 51b of the engagement member 51 can be inserted.

As shown in FIG. 19, in the above-described configuration, in the state where the engagement member 51 retreats from the post 15 side and the engagement member 51 does not engage with the engagement portion 52, the rear end portion 51b is inserted into the hole 80 of the fixing member 62A. Accordingly, the rim lifting portion 30 and the unloader 40 are integrally connected to each other.

First, as shown in FIG. 17, if the engagement member 51 advances toward the post 15 side and engages with the engagement portion 52, the rear end portion 51b of the engagement member 51 is disengaged from the hole 80. Therefore, the rim lifting portion 30 and the unloader 40 are disconnected from each other.

(Sixth Modification Example)

Figure 20:
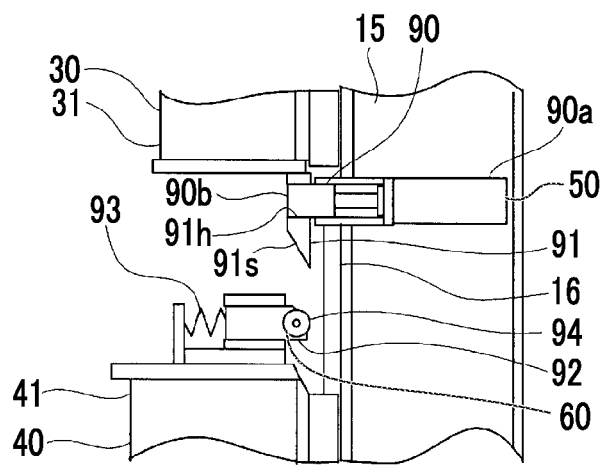
FIG. 20 is a view showing the modification examples of the engagement mechanism and the connection mechanism in the embodiment of the present invention, and a side view showing a state where the rim lifting portion and the unloader are disconnected from each other.
Figure 21:
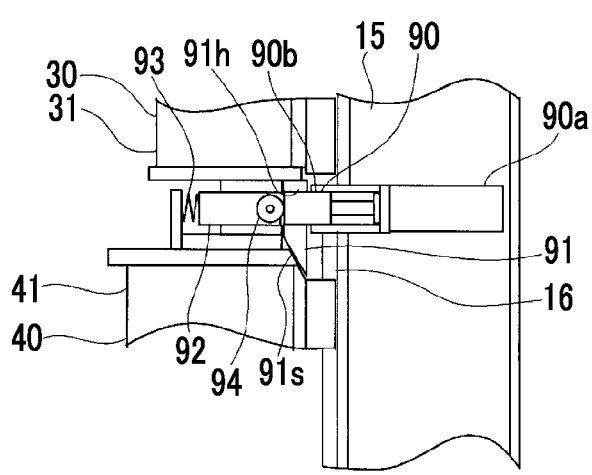
FIG. 21 is a view showing the modification examples of the engagement mechanism and the connection mechanism in the embodiment of the present invention, and a view showing a state during the connection between the rim lifting portion and the unloader.
Figure 22:
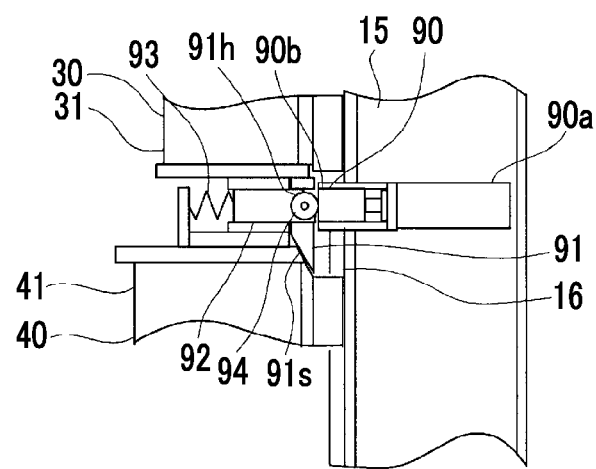
FIG. 22 is a view showing the modification examples of the engagement mechanism and the connection mechanism in the embodiment of the present invention, and a side view showing a state where the rim lifting portion and the unloader are connected to each other.

FIG. 20 is a view showing the modification examples of the engagement mechanism and the connection mechanism in the embodiment of the present invention, and a side view showing a state where the rim lifting portion and the unloader are disconnected from each other. FIG. 21 is a view showing the modification examples of the engagement mechanism and the connection mechanism in the embodiment of the present invention, and a view showing a state during the connection between the rim lifting portion and the unloader. FIG. 22 is a view showing the modification examples of the engagement mechanism and the connection mechanism in the embodiment of the present invention, and a side view showing a state where the rim lifting portion and the unloader are connected to each other.

As shown in FIGS. 20 to 22, the engagement mechanism and the connection mechanism 60 may include an engagement member 90 which is provided on the post 15 side, an engaged member 91 which is provided on the lower surface of the guide block 31 of the rim lifting portion 30 and extends downward, and a connection pin 92.

The engagement member 90 includes an air cylinder 90a which is provided in the post 15, and an engagement piece 90b which advances toward the rim lifting portion 30 side via the air cylinder 90a.

The engaged member 91 includes an insertion hole 91h into which the advanced engagement piece 90b is inserted. An inclined surface 91s is formed on the side opposing the connection pin 92 at the lower end portion of the engaged member 91. The inclined surface 91s is inclined to the side close to the connection pin 92 toward the upper side.

The connection pin 92 is provided on the guide block 41 of the unloader 40. The connection pin 92 is biased to the post 15 side by a biasing member 93 such as a coil spring. A rotatable roller 94 is provided on the tip portion of the connection pin 92.

As shown in FIG. 22, in the engagement mechanism 50 and the connection mechanism 60, the connection pin 92 biased by the biasing member 93 is inserted into the insertion hole 91h of the engaged member 91, and the rim lifting portion 30 and the unloader 40 are integrally connected to each other.

As shown in FIG. 20, if the engagement piece 90b is advanced by the air cylinder 90a, the engagement piece 90b is inserted into the insertion hole 91h of the engaged member 91. Accordingly, the rim lifting portion 30 engages with the post 15.

In this case, as shown in FIG. 21, the connection pin 92 in the insertion hole 91h is extruded by the engagement piece 90b which is inserted into the insertion hole 91h. Accordingly, the rim lifting portion 30 and the unloader 40 are disconnected from each other.

Moreover, as shown in FIG. 20, if the unloader 40 is lifted from the lower side in the state where the rim lifting portion 30 engages with the post 15 via the engagement mechanism 50, the roller 94 abuts the inclined surface 91a of the engaged member 91. Accordingly, the connection pin 92 retreats from the post 15 side. In addition, if the connection pin 92 reaches the insertion hole 91h of the engaged member 91, the engagement piece 90b is retreated by the air cylinder 90a, and the connection pin 92 is inserted into the insertion hole 91h by the biasing force of the biasing member 93.

(Other Modification Examples)

In the above-described embodiment and modification examples, in the tire support device 11, two sets of the tire holding portions 20, the rim lifting portions 30, and the unloaders 40 are provided linearly symmetrically while the center axis CL connecting the vulcanizer in a previous process and the center of the post 15 is interposed between two sets thereof. However, the present invention is not limited to this.

For example, only one set of the tire holding portion 20, the rim lifting portion 30, and the unloader 40 may be provided. In addition, the tire holding portion 20, the rim lifting portion 30, and the unloader 40 are provided on each of the plurality of posts 15, and thus, the plurality of PCI devices 10 may be arranged in parallel.

Moreover, in the above-described embodiment and modification examples, in the tire holding portion 20, the first rim 21, which is provided on each of the upper side and the lower side of the support shaft 24 via the first rim support portion 23, can be rotated around the horizontal axis. However, the present invention is not limited to this. One set of the first rim support portion 23 and the first rim 21 is provided, the first rim support portion 23 and the first rim 21 are not rotated around the support shaft 24, and only one set of tires T may be held by the tire holding portion 20.

INDUSTRIAL APPLICABILITY

An engagement mechanism which can move a second rim support portion and a transport portion along a guide of a frame and by which the second rim support portion can be engaged with a frame, and a supported portion which movably supports the second rim support portion and the transport portion along the guide are provided, and it is possible to decrease the manufacturing cost.

The invention claimed is:
1. A tire support device, comprising:
  a first rim support portion which supports a first rim mounted on a tire;
  a second rim support portion which is provided so as to oppose the first rim support portion and supports a second rim mounted on the tire;
  a frame which includes a guide which movably guides the second rim support portion in a direction approaching the first rim support portion and in a direction separating from the first rim support portion, the second rim support portion being attached to the guide;
  a transport portion which is attached to the guide to move along the guide, and performs at least one of extraction of the tire supported by the first rim support portion and attachment of the tire to the first rim support portion;

a drive portion which moves the transport portion along the guide;

an engagement mechanism which can engage the second rim support portion with the frame at a retreat position at which the second rim support portion is separated from the first rim support portion;

a supported portion which integrally supports the second rim support portion and the transport portion in a movable manner by the drive portion along the guide in a state where engagement with the engagement mechanism is released; and a connection mechanism which is configured to mechanically connect the second rim support portion and the transport portion in a vertical direction in a state where the second rim support portion and the transport portion are stacked in the vertical direction so that the second rim support portion and the transport portion are integrated in a state where engagement with the engagement mechanism is released, wherein the connection mechanism is configured to move the second rim support portion and the transport portion at a time in the vertical direction in a state where engagement with the engagement mechanism is released, the connection mechanism comprises:

a movement member which is provided on one of the second rim support portion and the transport portion, the movement member is configured to be moved by an engagement operation and a disengagement operation of the engagement mechanism; and a fixing member which is provided on the other of the second rim support portion and the transport portion, wherein the movement member comprises a through-hole extending in a horizontal direction, the through-hole comprises a first hole portion, and a second hole portion which is continuous with the first hole portion and which is provided further from the guide than the first hole portion, wherein a width of the second hole portion is larger than that of the first hole portion, the fixing member comprises a first shaft portion protruding toward the one of the second rim support portion and the transport portion, and a second shaft portion provided on a tip of the first shaft portion, a width of the first shaft portion is smaller than that of the first hole portion, a width of the second shaft portion is larger than that of the first hole portion and is smaller than that of the second hole portion, and the fixing member and the movement member are configured to engage with each other by arranging the first shaft portion in the first hole portion, and to disengage from each other by arranging the first shaft portion in the second hole portion via switching by the movement of the movement member.

2. The tire support device according to claim 1, wherein the engagement mechanism includes:

an engagement member which is provided on one of the second rim support portion and the frame, and can advance and retreat in a direction in which the second rim support portion and the frame are connected to each other;

an engagement portion which is provided on the other of the second rim support portion and the frame and engages with the engagement member which is in an advanced position; and an advancing-retreating portion which advances and retreats the engagement member.

3. The tire support device according to claim 2, wherein a key portion which protrudes downward is formed on the engagement member, and wherein a key engagement portion, which meshes with the key portion in a state where the engagement member engages with the engagement portion, is formed on the engagement portion.

4. A tire cooling system, comprising: a tire support device according to claim 1; and a fluid supply portion which can supply a fluid injected into the tire in which the first rim and the second rim are mounted.

5. A tire support device, comprising:

a first rim support portion which supports a first rim mounted on a tire;

a second rim support portion which is provided so as to oppose the first rim support portion and supports a second rim mounted on the tire;

a frame which includes a guide which movably guides the second rim support portion in a direction approaching the first rim support portion and in a direction separating from the first rim support portion, the second rim support portion being attached to the guide;

a transport portion which is attached to the guide to move along the guide, and performs at least one of extraction of the tire supported by the first rim support portion and attachment of the tire to the first rim support portion;

a drive portion which moves the transport portion along the guide;

an engagement mechanism which can engage the second rim support portion with the frame at a retreat position at which the second rim support portion is separated from the first rim support portion;

a supported portion which integrally supports the second rim support portion and the transport portion in a movable manner by the drive portion along the guide in a state where engagement with the engagement mechanism is released; and a connection mechanism configured to:

mechanically connect the second rim support portion and the transport portion in a vertical direction in a state where the second rim support portion and the transport portion are stacked in the vertical direction so that the second rim support portion and the transport portion are integrated in a state where engagement with the engagement mechanism is released, and move the second rim support portion and the transport portion at a time in the vertical direction in a state where engagement with the engagement mechanism is released, the connection mechanism comprises:

a movement member which is provided on one of the second rim support portion and the transport portion, and is moved by an engagement operation and a disengagement operation of the engagement mechanism; and a fixing member provided on the other of the second rim support portion and the transport portion, wherein the fixing member protrudes toward the one of the second rim support portion and the transport portion, the fixing member comprises a hole passing through the fixing member in a horizontal direction, and the fixing member and the movement member are configured to engage with each other by inserting the movement member into the hole and to disengage from each other by separating the movement member from the hole via switching by the movement of the movement member.

* * * * *